May 15, 1934.  M. B. CHAMBERS  1,958,608
ELECTROMAGNETIC BRAKE
Filed June 20, 1931   2 Sheets-Sheet 1

Morris Burr Chambers
Inventor
By his Attorney

May 15, 1934.　　　M. B. CHAMBERS　　　1,958,608
ELECTROMAGNETIC BRAKE
Filed June 20, 1931　　2 Sheets-Sheet 2

Morris Burr Chambers
Inventor

Attorney

Patented May 15, 1934

1,958,608

UNITED STATES PATENT OFFICE 1,958,608

ELECTROMAGNETIC BRAKE

Morris Burr Chambers, Huntington Park, Calif., assignor to Chambers Electric Brake Corporation, Seattle, Wash., a corporation of Washington Application June 20, 1931, Serial No. 545,633

3 Claims. (Cl. 188—140)

This invention relates to electro-magnetic brakes, and particularly to brakes for automotive vehicles, its object being the production of a brake which is simple and economical in its construction and which is adapted for application without substantial change in the design of the parts of the vehicle.

In brakes which are operated by manual power, a considerable force must necessarily be applied to set the brake in the first instance, and that force must be maintained while the brake is in action. Hydraulic or other fluid-pressure brakes require a pump for the fluid and means for operating the pump, all of which adds to the initial cost of the vehicle, to its weight and to its upkeep and operating expenses. My brake is operated electro-magnetically by current from the battery which furnishes the ignition and lighting currents and which is a part of the necessary equipment of the vehicle. Therefore, my brake adds but little to the initial cost of production of the vehicle and it adds substantially no weight. Further, the operation of the brake requires only a negligible amount of labor in setting or in maintaining it in its set position, all that is required being that expended in closing an electric switch and in maintaining the switch in closed position.

Figure 1:
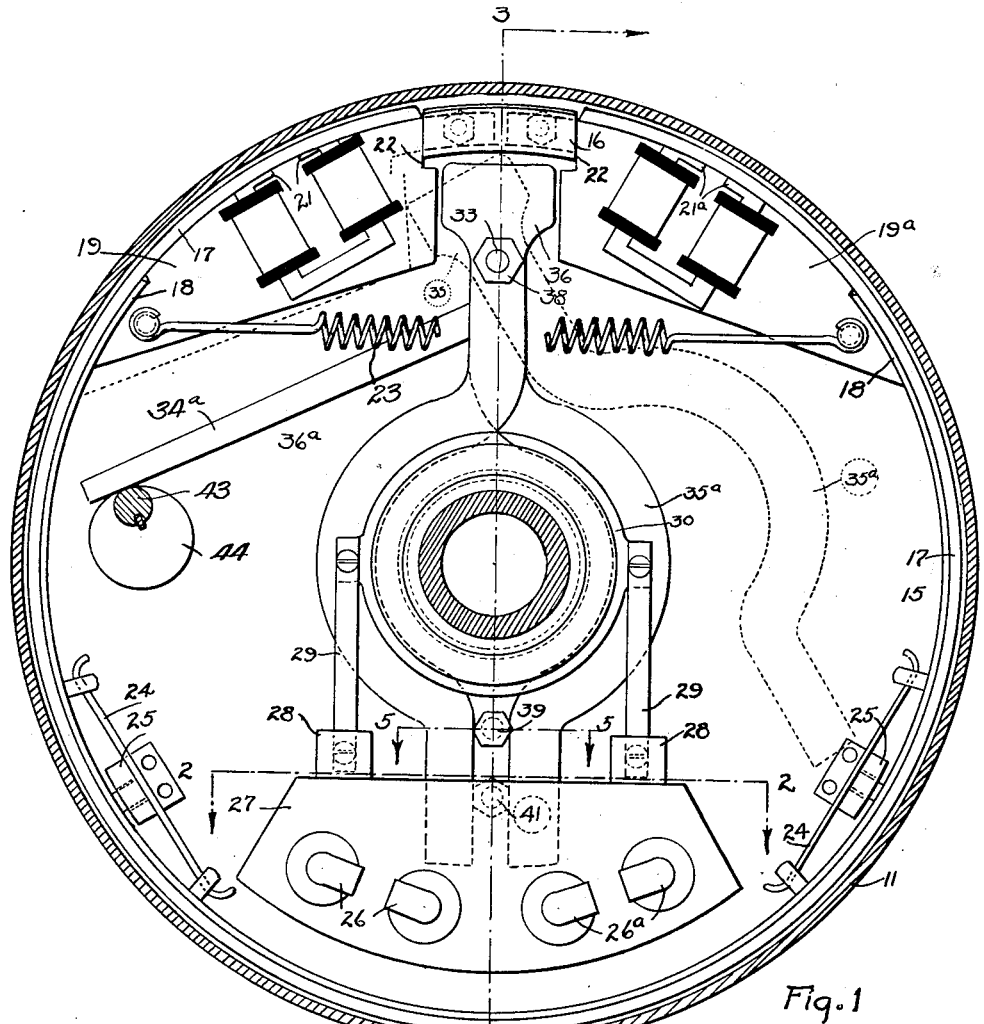
Figure 2:
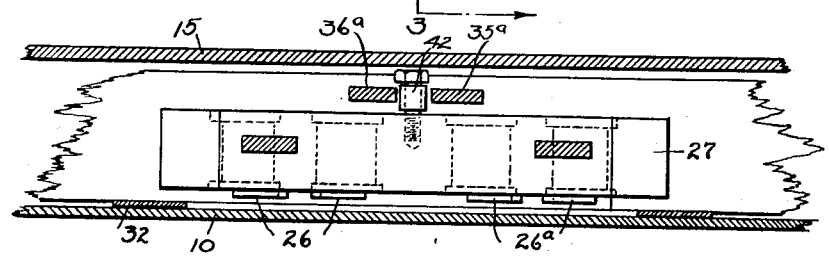
Figure 3:
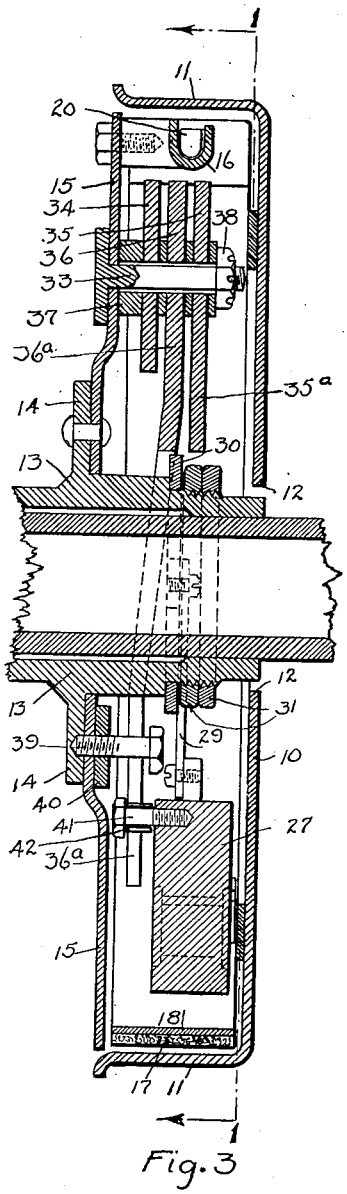
Figure 4:
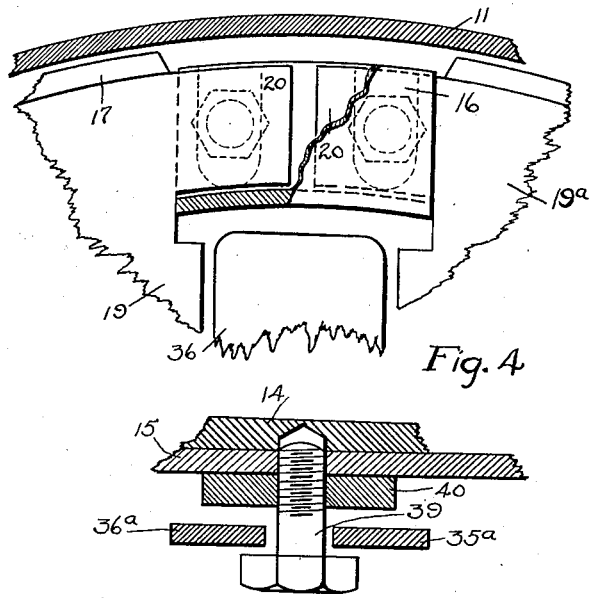
Figure 5:
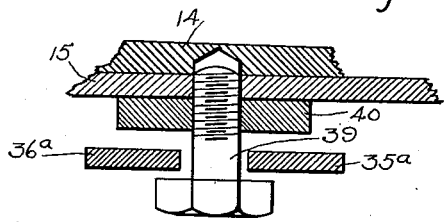
Figure 6:
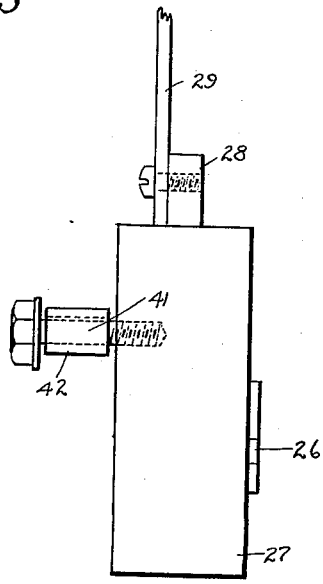

In the drawings forming a part of this application, Fig. 1 is a side elevation of the operating parts of the brake, the view being taken on the line 1—1 of Fig. 3; Fig. 2 is a sectional view on the line 2—2 of Fig. 1, looking in the direction of the arrows; Fig. 3 is a central vertical section through the brake, as on the line 3—3 of Fig. 1; Fig. 4 is a side elevation, partly broken away of the keeper for the brake shoes, the ends of the shoes being shown therein; Fig. 5 is a sectional view on line 5—5 of Fig. 1, and Fig. 6 is an end elevation of the carrier frame for the electromagnets shown at the lower part of Fig. 1.

The drawings show what I now consider the preferred embodiment of my invention, although it is realized that the details are capable of modification and the claims hereof are not intended to be limited to such details any further than the specific terms thereof make necessary. Further, the drawings illustrate a brake which is specially adapted to an automotive vehicle, such as a truck or automobile, whereas the brake is adapted for more general use. The structure shown may be used in connection with the brake drum of any wheel of the vehicle.

Taking up a detailed description of the invention, and referring to the drawings, 10 represents the brake drum which is provided with the peripheral flange 11, with the inner side of which the brake band is adapted to contact. The side portion of the drum is provided with a central opening 12 through which the axle (not shown) extends. In axial alinement with the opening 12 is a sleeve member 13 which surrounds the axle and is non-rotatable with respect thereto. The sleeve is provided with an outwardly extending flange 14, to which the back-plate 15 is suitably and rigidly attached. The said back plate is a flat, circular disk which cooperates with the drum 10 and 11 to form a housing within which the other parts of the brake are operatively mounted.

Within the upper part of the housing the back plate is provided with a keeper 16, which may be an integral part of the plate, or may be a separate member and welded or otherwise suitably attached to the plate. The keeper comprises a guide channel, for a purpose hereinafter specified.

Extending about and just within the flange 11 is the brake band, comprising the brake lining 17 and a steel band 18. The lining extends substantially from one end of the keeper 16 to the other; but the steel band terminates some distance from the keeper, its ends being secured to elements 19 and 19ª which are herein termed brake shoes. The body of each of these shoes extends to and abuts against the adjacent end of the keeper 16, where it is provided with a projecting horn 20 which extends into the guide channel of the keeper. The ends of the horns within the channel are spaced slightly to permit of a slight relative movement of one without contact with the other. The member 16 is not only a keeper or guide for these horns but is a stop or anchor for the brake shoes, as will be more fully explained.

The brake band is expanded into frictional contact with the flange 11 of the drum by electromagnetic means. For that purpose I may use, and have shown, two pairs of electro-magnets, one pair acting directly to pull the brake shoes outwardly and the other acting through suitable levers to thrust the said shoes outwardly. The two magnets of each pair are in an electric circuit which leads preferably to the battery of the vehicle, although other sources of current may be employed where more convenient. In case the brakes are used on electric street-cars, it would probably be preferable to take the current from the source which supplies current to the motor. No circuit wires are illustrated, since their arrangement will be obvious to those skilled in the art. The magnets for each brake should, however, be energized and deenergized simultaneously so that they will all act together.

One pair of electro-magnets is mounted rigidly in each of the brake shoes 19 and 19a. These magnets are designated 21 and 21a respectively. They are shown conventionally, since any suitably designed magnet will suffice. As shown, the magnets are of the horse-shoe type, the ends of the poles being curved to conform to the inner surface of the brake-drum flange 11 and being terminated just inside the brake-lining 17. The circuit for the magnets will, of course, be controlled by the operator of the vehicle through a suitable controller, and the strength of the current will be varied as conditions require. When the circuit is closed through the magnets 21 and 21a, the lines of force pass outwardly from one pole piece into the flange 11 of the brake drum, then back to the other pole piece and through the body of the magnet to the pole piece where it is assumed they started, thus completing the magnetic circuit. The flange 11 thus becomes the armature, and the magnets are drawn toward it to force the lining 17 into contact with the flange, it being noted that the brake shoes are each notched at 22 to permit of this outward movement. These notches may be omitted and the end surfaces of the shoes made plain and in line with the respective ends of the keeper 16. For reasons hereinafter set forth, however, it is preferred to bring the shoes closer together below the keeper. If, when the magnets are energized, the flange 11 is rotating clockwise, the lining 17 at the shoe 19a seizes the flange and travels with it for a slight angular movement. The brake band and both shoes move together with the flange until the shoe 19 is stopped by engaging with the keeper 16. Thereafter, the angular movement of the shoe 19a expands the brake band into frictional contact with the flange throughout substantially its entire area. If the flange 11 be turning in the opposite direction, or anticlockwise, when the magnets of the shoes are energized, the brake band at magnet 21 seizes the rim. In either case, the entire lining 17 contacts frictionally with the rim and is active in arresting its rotation. As shown, the magnetic circuit does not include the brake shoes, and these may be made of non-magnetic material. If they be made of iron or steel, they may comprise part of the magnetic circuit in which case the design of the magnet could be different from that conventionally shown, as will be obvious.

The brake band is, of course, normally out of contact with the flange, being held retracted by the tensioned spring 23 which is attached at its opposite ends to the respective brake shoes. At as many points as may be found desirable, the brake band is held normally retracted by tensioned leaf springs 24 which are supported at their central portions upon brackets 25 on the back plate 15 with their ends engaged beneath staple-like members on the steel band 18.

The pull of the magnets 21 and 21a need be but little more than what is necessary to overcome the tension of the spring 23 and to bring the lining 17 into contact with the rotating flange, since a relatively slight pressure of the flange is sufficient to cause the lining to seize, as has been described. However, I have provided another pair of electro-magnets 26 and 26a which, by acting through cams and levers, are adapted to cause the lining 17 to bear upon the flange 11 with a strong pressure. This pair of magnets may be used in conjunction with the magnets 21 and 21a, or either pair may be used alone. In any case, the corresponding magnets of all the brakes are actuated simultaneously, being under the same control.

The pair of electro-magnets 26, 26a, are mounted upon or substantially within a non-magnetic frame 27 which may be of any suitable shape, that shown having its outer surface concentric with the flange 11. On its inner or upper surface the frame is provided with lugs 28 near its ends by means of which it is suspended upon resilient links 29 which are attached at their upper ends to a ring 30. This ring is mounted to turn upon the sleeve member 13, being held in position on the sleeve by a pair of annular nuts 31 which are threaded on the sleeve, as shown in Fig. 3.

The magnets 26, 26a are preferably of the horse-shoe type, as shown, and their pole pieces face the side of the brake drum 10 and not the flange 11. The brake drum is thus in the magnetic fields of the magnets and serves as the armature. When the magnets are energized, the magnets are drawn into frictional engagement with the drum, or, preferably, with a wear-taking ring 32 which is mounted on the drum and is concentric therewith. The frame 27 moves with the magnets toward the drum 10, thus flexing the resilient links 29 which, when the magnets are deenergized, move the latter out of contact with the drum or the ring 32.

Looking at Fig. 1 and assuming that the drum is turning in the anti-clockwise direction, when the magnets 26, 26a, are energized they and the frame 27 will be carried about with the drum, the ring 30 turning upon the sleeve 13, as will be understood.

Projecting inwardly from the back plate 15 below the keeper 16 is a pin or bolt 33 upon which a plurality of cam levers are pivoted near their upper ends. As indicated in Fig. 3, there are three of these levers, the cams on which are represented at 34, 35 and 36 respectively. They are suitably spaced from the back plate and from one another by washers 37 and are held on the bolt by a nut 38. The cam 36 appears in full lines in Fig. 1 where it is in its normal or inactive position, and the cam 35 appears in dotted lines where it is in its active position. The cams extend between the opposing faces of the brake shoes 19 and 19a and are adapted to push these shoes away from the keeper or anchor 16, as is indicated in broken lines at the left of the keeper where the shoe 19 is displaced by the cam 35.

The cams 35 and 36 are provided with operating levers 35a and 36a, respectively, which curve in opposite directions about the sleeve 13 and then extend in parallel and spaced relation alongside the swinging frame 27, being held apart at their lower ends by a suitable stop. As shown, this stop is a stud-bolt 39 which projects from the back plate 15 or from a thickening member 40 which is welded or otherwise secured to the back plate. This detail is best shown in Fig. 5.

Projecting rearwardly from the swinging frame 27 and between the lower ends of the levers 35a and 36a is a stud bolt 41, the same having a sleeve 42 loosely journaled thereon and so positioned as to be engaged by the ends of said levers when the frame 27 is swung. Since the frame and the levers turn about different pivots, the point of contact of the sleeve 42 with the levers moves and would produce wear if the sleeve were not permitted to turn freely.

Assuming, as before, that the brake drum is turning in the anti-clockwise direction, the energization of the electro-magnets 26 and 26ᵃ causes the frame 27 to swing in the same direction and the sleeve 42, carried thereby, pushes the lower end of lever 35ᵃ to the right into some such position as is indicated in broken lines. The lower end of the other lever 36ᵃ is held against movement in that direction by the stop 39. The cam 35ᵃ pushes the brake shoe 19 away from the keeper 16 and causes the lining 17 at that shoe to seize the flange 11, whereupon the brake band is expanded, as has been described. If the brake drum is turning in the opposite or the clockwise direction, it is the lever 36ᵃ that is swung and the brake shoe 19ᵃ that is moved away from the keeper.

The arc through which the frame 27 swings will depend somewhat upon the condition of the brake lining. If it be new or not worn, a relatively short angular movement of the frame will suffice to cause the lining to seize, whereas a worn lining will require a much greater movement of the frame before it seizes. Where both pairs of magnets are used and the brake lining is worn, the frame 27 may strike the brake shoes and its ultimate movements be limited by them. When the magnets 21, 21ᵃ are not used, lighter or thinner brake shoes may be employed so that the frame 27 may have a more extended swing and the brake lining be used until it is worn thinner.

It is desirable that but little space be provided between the cams 34, 35 and 36 and the co-operating faces of the brake shoes. At the same time it is desirable that the keeper or anchor 16 be long enough to afford a good bearing for the horns 20 of the brake shoes. It is for these reasons that I prefer to provide the shoes with the notches 22.

The cam 34, Fig. 3, is independent of the magnets and is intended for manual operation. The cam may be rocked through any suitable means and, like the ordinary emergency brake, may be used to control the vehicle in case the current for the magnets should fail, or to hold the vehicle against movement, as in parking it. In Fig. 1, I have indicated a means for operating the cam 34 which comprises a rock shaft 43 which projects inwardly through the back plate 15 and carries a cam or eccentric 44. The shaft may be rocked manually through any suitable mechanism to cause the cam 44 to move the arm 34ᵃ, which arm is directly connected with the cam 34.

Having thus described my invention, I claim:

1. An electro-magnetic brake comprising a rotatable drum having a disk-like face and a peripheral flange, a stationary back-plate coaxial with said drum, said back-plate, face and flange forming a housing, a split brake-band within said housing, a brake-shoe for and attached to each end of the brake-band, an abutment on the back-plate projecting between the said brake-shoes and forming an anchor for the band, a pair of cams between the brake-shoes and adapted to force the respective shoes away from the anchor thus to bring the corresponding ends of the band into braking engagement with the flange, a lever for and connected with each of said cams, a carrier-frame adapted for movement in a path which is concentric with the said flange, an electro-magnet mounted on said carrier frame and so positioned that the brake-drum is included in the magnetic circuit of the magnet, means on the carrier frame between the said levers for engagement therewith, and an electro-magnet for and mounted on each of said brake-shoes, said latter magnets being so positioned that their magnetic fields include the flange of the brake-drum, said latter magnets being actuated simultaneously with the magnet on the carrier frame, as and for the purpose set forth.

2. An electro-magnetic brake comprising a drum having a peripheral flange thereon, said drum being rotatable in either a clockwise or anti-clockwise direction, a stationary back-plate coaxial with said drum, a split brake-band within the said flange, an abutment on the back-plate projecting between the ends of the brake-band and forming an anchor for the band, a pair of cams between the ends of the band and adapted to force the respective ends of the latter away from the anchor and into braking engagement with the flange, a lever for and connected with each of the said cams, a carrier-frame, an oscillatory member concentric with the said flange, resilient connections between the oscillatory member and the carrier-frame for supporting the latter, an electro-magnet mounted on said carrier-frame and so positioned that the brake-drum is included in the magnetic field of the magnet, and means on the carrier frame extending between the said levers for engagement therewith, whereby, when the drum is turning in one direction and the magnet energized, the magnet is attracted toward the brake-drum and is caused to move the carrier-frame with the drum to rock one of said levers and its cam to expand the brake-band, and when the drum is turning in the opposite direction and the magnet is energized, the frame is moved with the drum to rock the other lever and cause its cam to expand the brake-band into contact with the flange.

3. An electro-magnetic brake comprising a drum having a peripheral flange thereon, said drum being rotatable in either a clockwise or anti-clockwise direction, a stationary back-plate coaxial with said drum, a split brake-band within the said flange, an abutment on the back-plate projecting between the ends of the brake-band and forming an anchor for the band, a pair of cams between the ends of the band and adapted to force the respective ends of the latter away from the anchor and into braking engagement with the flange, a lever for and connected with each of the said cams, a carrier-frame, an oscillatory member concentric with the said flange, a pair of resilient links connecting the opposite ends of the oscillatory member with the carrier-frame for supporting the latter, an electro-magnet mounted on said carrier-frame and so positioned that the brake-drum is included in the magnetic field of the magnet, and means on the carrier-frame extending between the said levers for engagement therewith, whereby, when the drum is turning in one direction and the magnet energized, the magnet is attracted toward the brake-drum and is caused to move the carrier-frame with the drum to rock one of said levers and its cam to expand the brake-band, and when the drum is turning in the opposite direction and the magnet is energized, the frame is moved with the drum to rock the other lever and cause its cam to expand the brake-band into contact with the flange.

MORRIS BURR CHAMBERS.